United States Patent Office 3,341,627
Patented Sept. 12, 1967

3,341,627
POLYMERIC ANTI-STATIC COMPOSITION AND PROCESS
William Kenneth Wilkinson, Waynesboro, Va., assignor to E. I. du Pont de Nemours and Company, Wilmington, Del., a corporation of Delaware
No Drawing. Filed July 9, 1963, Ser. No. 293,833
5 Claims. (Cl. 260—898)

This invention relates to polymeric compositions which are useful as anti-static agents for polyacrylonitrile fibers. More particularly, this invention relates to novel addition polymers of certain polyethylene glycol acrylates.

The development of static in fabrics prepared from hydrophobic synthetic fibers is a well-recognized problem. Numerous finishes and additives have been prepared to reduce static development. Application of many of the finishes results in a modification of the hand of the fabric. Some stiffen the fabrics, some are oily, and others increase soiling. Incorporating the anti-static agent in fiber-forming polymers themselves is also known; however, most of the agents are water-soluble and tend to be removed during laundering and dry cleaning. Other agents become buried within the polymer and are not effective.

It is therefore an object of this invention to provide new polymeric anti-static compositions which may be incorporated in polyacrylonitrile fibers. It is another object of this invention to provide polyacrylonitrile spinning solutions which contain the polymeric anti-static compositions. A further object of this invention is to provide polyacrylonitrile fibers which retain their anti-static property after laundering and dry cleaning.

The aforementioned objects as well as other objects are attained by providing, as an anti-static agent, water insoluble addition polymers obtained by polymerizing an alkylphenoxy polyethylene glycol acrylate having the formula

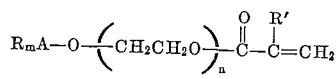

wherein R is an alkyl radical or from 1 to 20 carbon atoms, A is a phenylene radical, R' is selected from the group consisting of hydrogen and methyl, $m$ is an integer from 1 to 2, and $n$ is an integer from 4 to 40. These addition polymers are soluble in N,N-dimethylformamide and have an inherent viscosity in N,N-dimethylformamide from about 0.08 to 0.6 at room temperature (25° C.). Those polymers in which the ratio of the number of ethylene oxide groups, $(n)$, to the number of carbon atoms in the radicals R and A, i.e., $n/R_mA$, is between 0.28 and 4.0 are water-insoluble at temperatures below 100° C. and provide durable anti-static properties when incorporated in polyacrylonitrile fibers. The preferred polymers are those prepared from monomers in which the phenylene ring, A, is substituted by an alkyl group of from 6 to 14 carbon atoms, with from 20 to 40 polyethylene oxide groups being present in the ratio $n/R_mA$ of from 1.0 to 3.3.

It is indeed surprising that the water-insoluble polymeric acrylates of this invention function as anti-static agents. Heretofore, it has been thought that water solubility as well as hygroscopicity were necessary in order to provide anti-static properties.

It is essential that the limitations which have previously been defined be adhered to in order to provide water-insoluble anti-static agents which are soluble in dimethylformamide and durable in so far as laundering and dry cleaning is concerned. If the number of ethylene oxide groups is too large in comparison to $R_mA$, the polymer becomes water-soluble and is then not durable. If the number is too small, then the polymer becomes hydrophobic and will not swell with water. It is essential that the polymer be adequately hydrophylic to bind traces of moisture to the fiber surface at low humidities, i.e., below 30% relative humidity.

The polymeric anti-static agents of this invention are prepared by polymerizing the polyethylene glycol acrylate in an inert solvent such as dimethylformamide and using a free-radical polymerization catalyst. The polymerization is carried out at a temperature below the boiling point of the ingredients in the reaction mixture, preferably at a temperature from 20° C. to 80° C. It may then be added to a spinning solution which contains from about 25% to about 40% of the acrylonitrile polymer in an amount of about 1% to 15% by weight of the solution. While dimethylformamide is the preferred solvent, other well-known inert solvents used in acrylonitrile polymer spinning such as dimethylacetamide and dimethylsulfoxide, as well as others, may be used in the anti-static agent preparation and in spinning.

After preparation of the spinning solution, fibers are spun from the solution in the conventional manner, i.e., wet or dry. After removal of the solvent from the fiber, the polymerized polyethylene glycol acrylate is present in an amount from about 1% to about 10% by weight of the fiber. The polymeric acrylate is present as a separate phase in the fiber and is dispersed throughout the fiber in discrete particles of about 0.2 to about 20 microns in diameter. When the fibers are heated, as in drying, following washing and drawing, some of the polymeric acrylate exudes to the surface of the fiber where it forms a very thin film. This thin film is highly effective in preventing static build-up. Since the polymeric acrylate is not soluble in water, it is not removed by normal scouring. Severe scouring may remove a portion of the agent but upon drying more of the anti-static agents exude to the surface of the fiber in great enough quantities so that the anti-static effect is restored. It is not soluble in hydrocarbon dry cleaning solvents but may be partially removed by some halogenated solvents.

As indicated in the foregoing discussion, the polymeric acrylates of this invention are not soluble or miscible with acrylonitrile polymers. Those anti-static agents which are soluble in or miscible with acrylonitrile polymers are not suitable for incorporation in the fiber-forming polymer because they will not exude to the fiber surface at an appreciable rate.

The invention will be further illustrated by the following examples in which parts and percentages are by weight unless otherwise indicated.

EXAMPLE I

A nonylphenoxy polyethylene glycol having the formula:

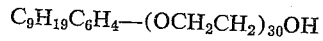

was esterified with acrylic acid by refluxing in toluene for 16 hrs. and constantly removing the water of esterification as an azeotrope. The composition of the esterification solution was:

| | Parts |
|---|---|
| Nonylphenoxy polyethylene glycol | 100.00 |
| Acrylic acid | 5.06 |
| Toluene | 27.50 |
| 2,6-ditertiary butyl-p-cresol (antioxidant) | 0.19 |
| Nitrobenzene | 0.04 |
| Sulfuric acid | 0.63 |

After refluxing, the solution was cooled then neutralized with solid sodium carbonate. It was then filtered and the toluene removed by low pressure distillation. The final product contained 98 to 99% of the acrylic ester and 0.26% free acrylic acid.

EXAMPLE II

The nonylphenoxy polyethylene glycol acrylic ester prepared in Example I was dissolved in dimethylformamide and polymerized using an organic peroxide and sulfur dioxide as catalyst and initiator in the following formula:

| | |
|---|---|
| Dimethylformamide _____ parts__ | 50.0 |
| Nonylphenoxy polyethylene glycol acrylate _do____ | 50.0 |
| Lauroyl peroxide _____do____ | 0.5 |
| Sulfur dioxide _____do____ | 0.5 |
| Temperature, ° C. _____ | 70 |
| Time, hours _____ | 16 |

To carry out the polymerization the above ingredients were mixed slowly under a blanket of nitrogen and heated for sixteen hours. A yield of 96% polymer was obtained as assayed by coagulation in water. The polymer was insoluble in water at temperatures from 0 to 100° C. and had an inherent viscosity of 0.1 measured in dimethylformamide.

In contrast, when polymers were made having methoxy end groups in place of the higher alkyl phenoxy end groups, the polymers were water-soluble and of no value as permanent anti-static agents.

EXAMPLE III

In this example the nonylphenoxy polyethylene glycol acrylate (NPPGA) of Example I was polymerized in an aqueous reaction mixture of the following composition:

| | |
|---|---|
| Water _____ parts__ | 80.00 |
| NPPGA _____do____ | 80.00 |
| Potassium persulfate _____do____ | 0.20 |
| Sodium bisulfite _____do____ | 0.05 |
| pH _____ | 3–4 |
| Temperature, ° C. _____ | 70 |
| Time, hours _____ | 1 |

The water solution was blanketed with nitrogen and heated to the indicated temperature. After 45 minutes the solution became hazy and after an hour a viscous precipitate had formed. It was washed with hot and with cold water to remove traces of unreacted monomer. The polymer was finally dried at 95° C. under vacuum (20 mm.) to give a light yellow polymer which solidified after standing two days at 25° C. A yield of 99% polymer was obtained. It was insoluble in water but soluble in dimethylformamide, acetone, toluene and ethanol. The polymer had an inherent viscosity of 0.32 in dimethylformamide.

EXAMPLE IV

The NPPGA of Example I was polymerized in dioxane solution using an azo catalyst under the following conditions.

| | |
|---|---|
| Dioxane _____ parts__ | 60.0 |
| NPPGA _____do____ | 65.0 |
| Bis-azodiisobutyronitrile _____do____ | 0.7 |
| Temperature, ° C. _____ | 70 |
| Time, hours _____ | 16 |

The conversion of monomer to polymer was 95%. The polymer had an inherent viscosity of 0.13, measured in dimethylformamide. The polymer was insoluble in water and hexane but soluble in methanol, acetone, dimethylformamide, and chlorinated hydrocarbons.

Similar results are obtained when dimethylformamide is substituted for the dioxane in the above formula. Other polyacrylates were prepared by substituting for NPPGA nonylphenoxy polyethylene glycol acrylates having the formula:

where $x=4, 9, 11$ and $30$.

When $x=100$ the polyacrylate was water-soluble.

EXAMPLE V

In this example a nonylphenoxy polyethylene glycol acrylate of the following formula was used:

This glycol acrylate was polymerized in dimethylformamide solution of the following composition and under the conditions shown:

| | |
|---|---|
| Dimethylformamide _____ parts__ | 170.0 |
| Acrylate (as above) _____do____ | 170.0 |
| Lauroyl peroxide _____do____ | 1.7 |
| Sulfur dioxide _____do____ | 0.3 |
| Temperature, ° C. _____ | 70 |
| Time, hours _____ | 2 |

A conversion of 98% monomer to polymer was obtained. The polymer had an inherent viscosity in dimethylformamide of 0.12. This polymer, unlike the previous polymers was insoluble in methanol. It was insoluble in water and hexane but soluble in acetone, dimethylformamide and trichloroethane.

Although it was expected that by decreasing the number of ethylene oxide units water sensitivity would decrease with a resulting decrease in conductivity and antistatic effect, surprisingly, conductivity was excellent and at the same time the solubility in water at temperatures to 100° C. was only a few parts per million.

EXAMPLE VI

A polymer was prepared by copolymerizing a mixture of 93.6 parts acrylonitrile, 6.0 parts methyl acrylate, and 0.4 part sodium styrene sulfonate. This terpolymer was dissolved in dimethylformamide.

To separate portions of this solution various polynonylphenoxy polyethylene glycol acrylates were added as shown in the table below. The final solutions contained 28% of the polacrylonitrile terpolymer and 1.7% of the polyacrylates. These solutions were dry spun to yield fibers which, after washing and drawings, were of 3 denier (0.33 tex.) per filament. This fiber was cut into staple lengths, spun into yarn and then knit to give a set of knit jersey tubings. The resistivities of these fabrics were measured and the results, expressed as Log R, recorded. The measurements of Log R were made at a relative humidity (RH) of 20%. The variations of the log of the resistivity (Log R) with ethylene oxide units in the acrylate polymer is reported in the table which follows:

| | Number of Ethylene Oxide Units in Antistatic | Log R |
|---|---|---|
| Acrylonitrile Polymer Fiber (ANP) (no anti-static agent) | | 15.0 |
| Cotton (no anti-static agent) | | 13.2 |
| ANP | [1] 100 | 12.7 |
| ANP | [1] 30 | 11.5 |
| ANP | [1] 11 | 11.5 |
| ANP | [1] 9 | 11.5 |
| ANP | [1] 6 | 11.5 |
| ANP | [1] 4 | 11.4 |

[1] Water soluble.

While the product containing 100 ethylene oxide units did impart some anti-static quality to the fibers, it was not durable due to its water-solubility and had a resistivity 16 times higher than the durable, water-insoluble anti-static agents of the present invention.

EXAMPLE VII

In this example fibers were spun from polyacrylonitrile solutions containing various amounts of a single polynonylphenoxy polyethylene glycol acrylate prepared from a monomer of the formula:

In this case the conductivity was measured using a potential of 220 volts D.C. at 25% RH after 10 and 25 launderings in a home type automatic washer. In the following table the percent of the acrylate polymer is based upon the dry weight of the polyacrylonitrile fiber. The results are expressed as Log R values.

|  | Log R Values | |
|---|---|---|
|  | 10 Washes | 25 Washes |
| ANP (No Anti-static Agent) | 15+ | 15+ |
| Cotton | 13.2 | 13.2 to 13.7 |
| ANP+2.2% anti-static agent | 13.3 | 13.8 |
| ANP+4.0% anti-static agent | 12.9 | 13.3 |
| ANP+6.0% anti-static agent | 12.2 | 13.1 |
| ANP+10.0% anti-static agent | 11.1 | 12.6 |

Thus with as little as 2.2% of the anti-static agent spun into the fiber, the Log R values were approximately equal to those for cotton and with higher concentrations of agents the values show superior anti-static protection.

EXAMPLE VIII

In this example the utility of other alkyl substituted aryl end groups is exhibited. Acrylate esters were made using the procedure of Example I, to make monomers of the following:

| "Igepal"* RC-520 | 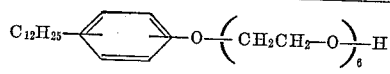 |
| "Igepal"* RC-760 | 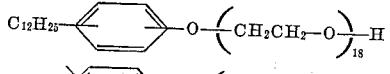 |
| "Igepal"* DM-530 | 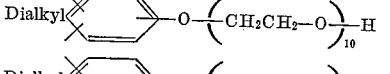 |
| "Igepal"* DM-710 | 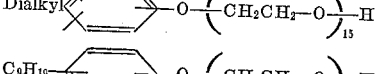 |
| "Igepal"* CO-880 | 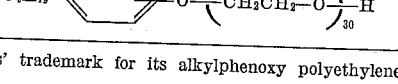 |

*Antara Chemicals' trademark for its alkylphenoxy polyethylene ethanols.

The acrylate monomers therefrom ranged from slightly water-soluble to very water-soluble as the number of PEO units increased.

Polymers were prepared from the monomers according to the procedure described in Example IV. All of the polymers were insoluble in water and insoluble in 80/20, acetone/water, differing grossly from the starting monomers which were soluble in the latter solvent mixture.

When small amounts of the water-insoluble polyacrylates were applied to the fiber surface and measured for resistivities, they were found to be as effective as anti-static agents as the products of Examples V and VI. The results are set forth in the following table:

TABLE 1

| Anti-static Agent | Percent on Fiber, Polyacrylate | Log R at 25% RH |
|---|---|---|
| None | | 15+ |
| "Igepal" RC-520 | 0.1 | 13.3 |
| "Igepal" RC-760 | 0.1 | 11.9 |
| "Igepal" DM-530 | 0.1 | 12.5 |
| "Igepal" DM-710 | 0.1 | 12.3 |
| "Igepal" CO-880 | 0.1 | 12.0 |

All of the polyacrylates were soluble in dimethylformamide and could be cospun with acrylonitrile polymers as described in Example VII.

EXAMPLE IX

The following experiment was conducted to determine the concentration of anti-static agent required on the surface of polyacrylonitrile fibers in order to prevent static build-up. Various concentrations of the polyacrylate of a nonylphenoxy polyethylene glycol acrylate having the formula:

were applied to the fiber surface. Bundles of fibers containing 30.0 grams of treated fiber were placed between two electrodes which were spaced 6 inches apart. A voltage of 210 volts (D.C.) was applied and the current passing through the fibers was measured using a Beckman, Model V micromicroammeter. The conductivity was measured in microampers and the log of the resistance (Log R) was calculated. The results are set forth in the following table:

Table 2

| Percent anti-static agent on the fiber surface: | Log R (25% relative humidity) |
|---|---|
| Cotton (none) | 13.2 |
| Control (none) | 15+ |
| 0.002 | 14.5 |
| 0.004 | 13.2 |
| 0.006 | 12.6 |
| 0.01 | 12.2 |
| 0.06 | 11.8 |
| 0.14 | 11.6 |
| 0.6 | 11.2 |

From the data in Table 2 it will be noted that only about 0.004% of the anti-static agent, based on the weight of the fiber, is required on the fiber surface to make the polyacrylonitrile fibers as conductive as cotton. Thus a concentration of 4% of the anti-static agent in the fiber would be sufficient for one thousand theoretical replacements provided all of the agent would eventually exude to the surface of the fiber.

In addition to the polyethylene glycol acrylates described in the foregoing examples, many additional polymers within the scope of the present invention provide anti-static properties when incorporated in acrylonitrile polymer fibers. The acrylic acid esters as well as the methacrylic acid esters of methylphenoxy-, dimethylphenoxy-, butylphenoxy-, dibutylphenoxy-, tertiary butylphenoxy-, ditertiary butylphenoxy-, hexylphenoxy-, octaphenoxy-, isooctaphenoxy-, diamylphenoxy-, tertiary hexylphenoxy-, dodecylphenoxy- and octadecylphenoxy polyethylene oxide glycol may be polymerized to provide anti-static agents which may be incorporated in a number of acrylonitrile polymer fibers. Those fibers containing at least 85% acrylonitrile and from 2 to 15% of one or more copolymerized ethylenically unsaturated monomers are preferred. The copolymerizable monomers are well-known to the art and may be of the type mentioned in U.S. Patents 2,436,926 and 2,743,994. In addition, the polymers may contain from about 0.1% to about 10% of a copolymerizable monomer having sulfonic acid or sulfonate salt groups of the type described in U.S. Patent 3,020,265 as well as vinylarene sulfonic acid or sulfonate groups of the type described in U.S. Patents 2,837,500 and 2,837,501.

In addition to the advantages provided by the anti-static agents of the present invention which have already been mentioned, the polymeric acrylates are free of ionic groups and are therefore not reactive with or deactivated by heavy metal ions such as calcium, magnesium and iron which are normally found in water. For the same reason, they are not stained by dyes as are anti-static agents which contain amino cationic groups or sulfonate, sulfate, or chloride anions. In addition, the anti-static agents of the present invention do not develop color as do amino compounds which readily undergo oxidation.

Another important advantage provided by the anti-static agents of the present invention is related to their rate of exudation to the surface of the fiber. By maintaining the composition of the agent within the aforementioned limits and using from about 2% to 8% by weight of the agent in preparing fibers, a fabric will remain free of static for its normal lifetime since only a small part of the agent exudes to the surface at any one time. The rate of exudation is negligible at room temperature and most exudation occurs during the heating and drying operation following laundering. This is a particularly desirable feature since it is after laundering that the replenishment of the anti-static agent on the surface of the fiber is most likely to be needed.

What is claimed is:

1. An acrylonitrile polymer fiber having admixed therein from about 1% to about 10% by weight based on said fiber of a water-insoluble addition polymer of an alkylphenoxy polyethylene glycol acrylate having the formula:

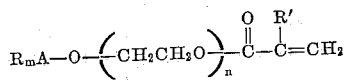

wherein R is an alkyl radical of from 1 to 20 carbon atoms, A is a phenylene radical, R' is selected from the group consisting of hydrogen and methyl, $m$ is an integer from 1 to 2, and $n$ is an integer from 4 to 40, the ratio of the number of $(CH_2CH_2O)$ groups to the number of carbon atoms in the radicals R and A, $n/R_mA$, being between 0.28 and 4.0, said polymer being soluble in N,N-dimethylformamide and having an inherent viscosity measured therein of from about 0.08 to 0.6.

2. The fiber of claim 1 wherein said polymer is present in an amount from 2 to 8% by weight of said fiber, said radical R contains from 6 to 14 carbon atoms and $n/R_mA$ is from 1.0 to 3.3.

3. The fiber of claim 2 wherein $R_mA-$ is a nonylphenyl radical and R' is hydrogen.

4. A spinning solution comprised of acrylonitrile polymer in a solvent therefor and from about 1% to about 15% by weight based on the total weight of the solution of a water-insoluble addition polymer of an alkylphenoxy glycol acrylate having the formula:

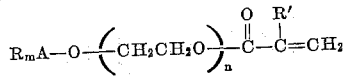

wherein R is an alkyl radical of from 1 to 20 carbon atoms, A is a phenylene radical, R' is selected from the group consisting of hydrogen and methyl, $m$ is an integer from 1 to 2, and $n$ is an integer from 4 to 40, the ratio of the number of $(CH_2CH_2O)$ groups to the number of carbon atoms in the radicals R and A, $n/R_mA$, being between 0.28 and 4.0, said polymer being soluble in N,N-dimethylformamide and having an inherent viscosity measured therein of from about 0.08 to 0.6.

5. A process for preparing anti-static acrylonitrile polymer fibers which comprises dissolving an acrylonitrile polymer in a solvent therefor, adding to said solution from about 1% to about 15% by weight based on the total weight of the solution of a water-insoluble addition polymer of an alkylphenoxy glycol acrylate having the formula:

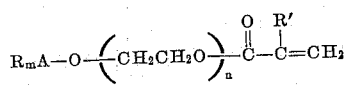

wherein R is an alkyl radical of from 1 to 20 carbon atoms, A is a phenylene radical, R' is selected from the group consisting of hydrogen and methyl, $m$ is an integer from 1 to 2, and $n$ is an integer from 4 to 40, the ratio of the number of $(CH_2CH_2O)$ groups to the number of carbon atoms in the radicals R and A, $n/R_mA$, being between 0.28 and 4.0, said polymer being soluble in N,N-dimethylformamide and having an inherent viscosity measured therein of from about 0.08 to 0.6, and thereafter spinning said solution through a spinneret to form said fibers.

References Cited

UNITED STATES PATENTS

| | | | |
|---|---|---|---|
| 3,046,226 | 7/1962 | Sandberg et al. | 260—47 |
| 3,112,282 | 11/1963 | Jones et al. | 260—29.6 |
| 3,157,714 | 11/1964 | Combe et al. | 260—898 |
| 3,207,718 | 9/1965 | Zimmerman et al. | 260—837 |

MURRAY TILLMAN, *Primary Examiner.*

J. WHITE, *Assistant Examiner.*